2 Sheets—Sheet 1.

B. F. STEWART.
Permutation-Lock.

No. 203,299. Patented May 7, 1878.

Attest.
J. H. Booth
Daniel Korns.

Inventor.
Benjamin F. Stewart
R. S. & A. P. Lacey
att'ys

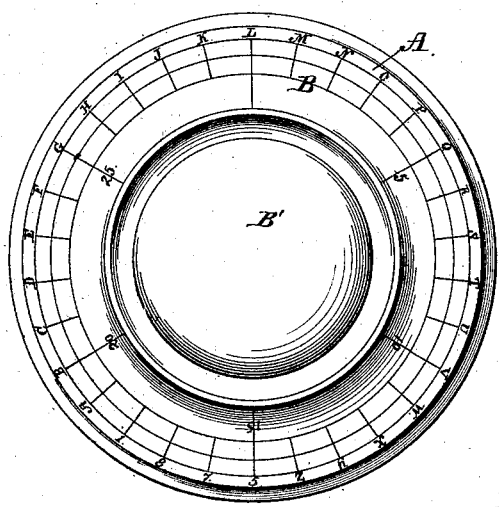

UNITED STATES PATENT OFFICE.

BENJAMIN F. STEWART, OF NEW PHILADELPHIA, OHIO.

IMPROVEMENT IN PERMUTATION-LOCKS.

Specification forming part of Letters Patent No. 203,299, dated May 7, 1878; application filed August 3, 1877.

*To all whom it may concern:*

Be it known that I, BENJAMIN F. STEWART, of New Philadelphia, in the county of Tuscarawas and State of Ohio, have invented certain new and useful Improvements in Permutation or Combination Locks; and I do hereby declare that the following is a full, clear, and exact description thereof, which will enable others skilled in the art to which it pertains to make and use the same, reference being had to the accompanying drawings, and to the letters of reference marked thereon, which form a part of this specification.

This invention relates to improvements in permutation-locks, the nature of which will be hereinafter fully explained, reference being made to the accompanying drawings, forming a part of this specification.

Figure 1:
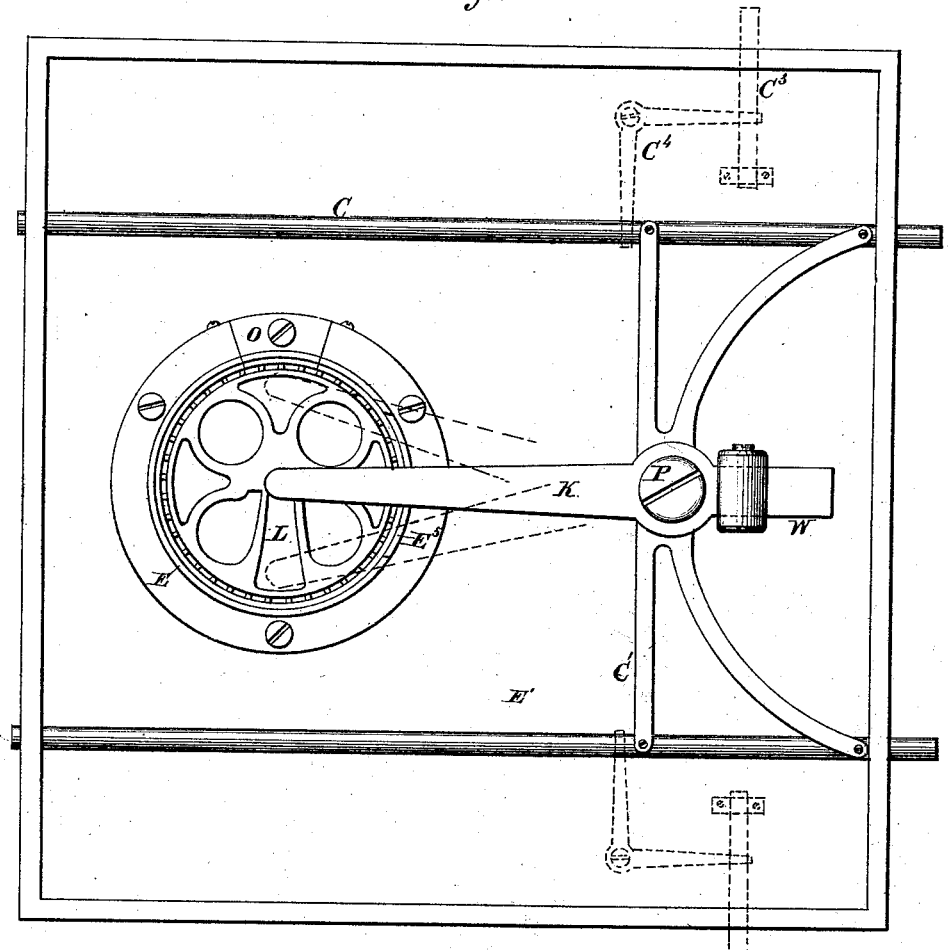
Figure 2:
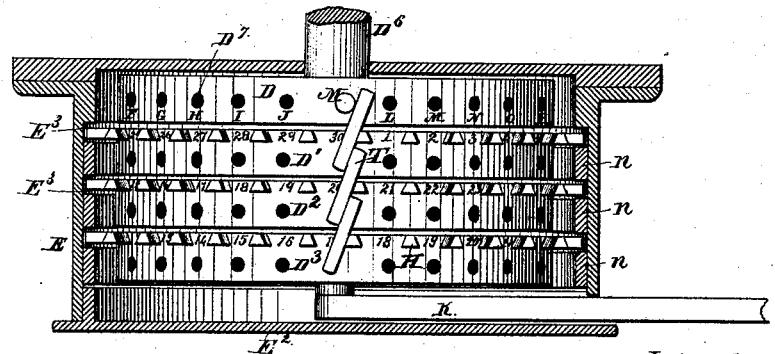

In the drawings, Figure 1 shows the inner side of a safe-door with my improved lock attached thereto. Fig. 2 is a side view of the tumblers, a portion of the casing being removed to expose them. Fig. 3 shows the fixed and revolving dials fitted together and attached to the outer side of the door. Fig. 4 is a side view of one of the slotted toothed tumblers. Fig. 6 is the operating-tumbler; and Figs. 5, 7, and 8 are detail views.

E is the casing, in which are placed the tumblers. It is suitably formed, so that it can be securely fastened to the door $E^1$, and it is formed with a removable cap, $E^2$, and has a section, O, cut out of the upper side, to provide facilities for reaching the tumblers when it is desired to change the combination of the lock. The casing is further constructed with the parallel grooves or channels $E^3$, which are formed around on the inner face of the tubular part E, and has the slot or opening $E^5$, through which the end of the balanced finger or actuating bar, hereinafter described, is inserted into the lock.

The channels $E^3$ receive the ends of the teeth on and serve as guides to preserve a steady and regular movement of the tumblers as the latter are made to revolve in the operation of the lock. The channels $E^3$ may be formed in, or may be formed by, strips $n$, suitably arranged and affixed to the inner face of the tubular casing E.

D $D^1$ $D^2$ $D^3$ are a series of tumblers, equal in diameter, and placed in the casing E. They are suitably indexed with letters and numbers, for the purpose of forming combinations, as hereinafter explained. Each tumbler is composed of a horizontal plate or rim, $D^4$, and a transverse plate, $D^5$. The rim $D^4$ is perforated with a series of holes, as shown, for the reception of the stem of the stops and pawls by which the tumblers are revolved. The holes in the rims are numbered or lettered, as hereinafter explained.

D is the actuating-tumbler, which is provided with a stem or arbor, $D^6$, which extends through to the outer side of the door $E^1$, and has affixed thereto the revolving dial B and handle or knob $B'$. On the transverse plate $D^5$ of the tumbler D is formed a radial cam-groove, S, extending from the center to and made with an enlargement, Y, at or near the rim $D^4$. In the holes $D^7$ in the rim of the tumbler D, is inserted the stem of the removable stop M.

The tumblers $D^1$ $D^2$ $D^3$ are each constructed with a series of wedge-shaped teeth, H, standing out at right angles from the rim $D^4$, immediately in front of the line on which they are placed, and so that they alternate in position with the holes $D^7$. The number of holes and the number of teeth provided for the tumblers $D^1$ $D^2$ $D^3$ correspond with the number of holes in the rim of the tumbler D. The teeth H are made wedge-shaped, as shown, so that they are adapted to present a flat face for the swinging stop or pawl to strike against, thereby securing better operation and preventing the wearing away of or injury to either pawl or teeth.

L is a radial guide-slot formed through the transverse plate of the tumblers $D^1$ $D^2$ $D^3$, through which the finger on the balanced bar enters the lock so as to be caught by the cam-groove S. In contour the slots L coincide with the groove S, except that the latter has the enlargement Y. They are formed entirely within the rim $D^4$, and embrace the center, as shown, so that the finger on the actuating-bar, hereinafter described, slides between the center and the rim, and is at all times held therein, thereby securing the most exact and perfect action.

It will be seen that the tumblers $D^1$ $D^2$ $D^3$ have no fixed axle on which they revolve and from which they receive motion, but that they are preserved with their axes or centers of motion in the same axial line with the center of motion of the tumbler D by the teeth H fitting snugly and moving in the grooves $E^3$ in the casing; and it will be further seen that the slots L and groove S are so formed about the center of motion that, as the tumblers revolve, there will be an axial opening, in which the finger of the finger-bar will rest when the locking combination of the tumblers is disarranged.

The tumblers $D^1 D^2 D^3$ receive motion through force applied on their peripheries, as hereinafter explained; and for indexing the tumblers and dials I employ both numbers and letters. The number of holes in the tumblers may be any desired quantity. I have, for convenience, selected 30 as the highest number. On the tumblers $D^1 D^2 D^3$ I have placed the numerals 1 to 30 inclusive, and on the tumbler D, I have placed the letters of the alphabet. The additional spaces above the number of the letters may be supplied by figures or arbitrary characters, or may, if preferred, be left blank.

A is the stationary dial affixed to the outer side of the door $E^1$, and so as to have the arbor $D^6$ for a center. It is graded or spaced to correspond with the number of holes in the rims of the tumblers, and is indexed with letters to correspond with indexing of the actuating-tumbler D. In the combination selected for the lock the letter selected on the dial is called the "governing-letter," for, in operating the lock, the several numerals must be brought opposite this letter in order that the numbered tumbler shall be brought into its proper position.

B is the revolving dial, which is affixed to the arbor $D^6$ of the tumbler D, and is so formed that it fits neatly on the face of and within the line of spacing or degrees on the dial A. It has its periphery graded, or spaced and numbered, as shown, to correspond with the numbers on the rims of the tumblers $D^1 D^2 D^3$.

M is a removable stop provided with a stem, $m$, which may be inserted in any desired one of the holes $D^7$, its position being in that hole designated by the governing-letter.

T is a pawl provided with a stem, $t$, which is inserted in any one of the holes in the rim of its tumbler $D^1 D^2 D^3$. There are as many pawls as tumblers $D^1 D^2 D^3$. This pawl, when attached to the tumbler, has a swinging movement between the two teeth H next in front of it, and its end extends over the top of the rim of the tumbler next in front, and so as to engage the rear end of the pawl on said next tumbler.

K is the finger-bar. It may be pivoted to the cross-bar $C'$, connected with the bolts C, in which case it is the actuating-bar by which the bolts are moved; or it may be pivoted to the door $E^1$, in which case its outer end will be so constructed as to drop behind and engage and lock the bolts, the latter, in this construction, being moved by a second knob on the outer side of the door.

I prefer to employ the construction shown in the drawings, for thereby I am enabled to dispense with the second knob for moving the bolts, the whole being operated by the single knob, and, as a result, the safe-door is perforated by a single hole.

The inner end of the finger-bar K enters the lock through the slot $E^5$, and is provided with pin or stud $K^1$, which passes through the slots L in the tumblers into the cam-groove S. The outer end of this bar is provided with an adjustable weight, W, which may be so arranged as to completely balance the inner end; but, in practice, the inner end is left so as to slightly overbalance the weight, and drop, of its own gravity, down in the slots L when the latter are properly arranged. By this finger-bar I am enabled to overcome the sensitiveness of the tumblers to the bar, so that it is impossible for any person unacquainted with the combination to which the lock is set to "feel" the tumblers and "set" the combination. The slightest movement of the knob will move a tumbler, and the latter will remain stationary in the position left by the cam-tumbler D.

In the construction and arrangement of the tumblers D and revolving dial B the indexing on the dial is so arranged that when the degree marked "30" is brought opposite to the degree marked "A" on the stationary dial, the cam-groove S will occupy a vertical position, with the enlarged end Y down, as shown in Fig. 6.

The operation of the device is as follows: It will be understood that the pawls T and stop M may be placed in any of the holes in the rims of the tumblers, and any desired combination be thus made up. I have selected for illustration the following combination, viz: The letter K as the governing-letter, the number 30 for tumbler $D^1$, 20 for tumbler $D^2$, and 10 for tumbler $D^3$. The stop M is placed in the hole marked "K" in the rim of tumbler D, and pawls T are attached to the tumblers $D^1 D^2 D^3$ in holes numbered 30, 20, and 10, respectively, and will present the appearance shown in Fig. 2.

By inspecting Fig. 2 it will be readily understood that, with stop M and pawls T arranged as therein shown, if the knob $B'$, with its tumbler D, be made to revolve in the direction indicated by the arrow 1, all the tumblers will revolve simultaneously; and it will be further understood that if the tumbler D is revolved once around in the direction indicated by arrow 2, the stop M will be brought into engagement on the opposite side of the pawl T on tumbler D, and will carry the latter around with it. Two revolutions will engage tumbler $D^2$, and three revolutions will engage tumbler $D^3$, when all will revolve in the new direction, with the pawls and stop in the position indicated in dotted lines.

As the person who wishes to unlock the door cannot know the relative positions of the stop and pawls, I give the following directions for adjusting the tumblers: Turn the knob $B'$ three times round in either direction, which will bring the tumblers all to revolving simultaneously; after which continue the turning movement till the number 10 on dial B is opposite the governing-letter K on dial A. This will bring the slot L of tumbler $D^3$ into the vertical position indicated in Fig. 1. Now reverse the movement of the knob B', and give it two complete revolutions, and bring the number 20 opposite the governing-letter K, when the slot L in tumbler $D^2$ will be brought into a vertical position in rear of and coincident with the slot in tumbler $D^3$. Again reverse the movement of the knob, and give it one complete revolution, and carry the number 30 to the governing-letter K, and the slot L in tumbler $D^1$ will be brought coincident with the slots in tumblers $D^2$ $D^3$. Again reverse the movement of the knob, and bring the number 30 opposite the letter A on dial A, which movement puts the cam-groove into a vertical position in rear of and coincident with the slots L of the several tumblers.

It will now be seen that the finger $K^1$ is relieved from its position in the center of motion of the tumblers, and will, of its own gravity and the gravity of the bar K, drop down to the lower end of the cam-groove S, as indicated in dotted lines $K^2$, Fig. 1. By turning the knob in the direction of arrow 1, Fig. 2, one-fourth of a revolution, the end of the finger $K^1$ will be drawn into the cross-groove Y, and carried so as to bring the bar into a horizontal position, which movement will draw the bolts, and the door will be unlocked.

The object of the cross slot or enlargement Y is to provide a seat for the end of the finger $K^1$ and prevent any slipping or imperfect action or movement of the actuating-bar K.

It will be readily seen that the finger $K^1$ will be held firmly and immovably in said slot Y during the turning of the knob in unlocking the door.

The door is locked by continuing the turning of the knob until the finger $K^1$ and bar K are brought into the position indicated in Fig. 1, dotted lines $K^3$, after which a slight reverse movement of the knob brings the finger $K^1$ into the cam-groove S and slots L, when it drops of its own gravity into its seat in the center of the tumblers, and the door is locked.

It will be seen that the operations hereinbefore described are all accomplished with a single knob, and that the door is perforated with a single hole. If the bar K were pivoted to the door, a second knob would have to be employed, and the door perforated accordingly. In this case, when the finger $K^1$ of the bar K drops down in the groove S, the weighted end of the bar will be drawn from behind the bolts; and when the finger drops into the center of motion the outer end of the bar is brought behind the bolts and secures them. When this construction is employed the cross-slot Y is dispensed with and the groove S is made slightly more rounding on the opposite side from the slot Y.

Having described my invention, what I claim, and desire to secure by Letters Patent, is—

1. The pivoted bar K, constructed with the finger $K^1$, in combination with the bolts of a permutation-lock, and the tumbler D, having cam S, and tumbler $D^1$, having the internal slot L, substantially as set forth.

2. The tumbler D, constructed with the cam-groove S, having enlargement Y on its transverse plate, and supported on the arbor $D^6$ of the dial B, and provided in its rim with a series of indexed holes, $D^7$, and stop M, substantially as and for the purpose set forth.

3. The tumbler $D^1$, constructed with an internal radial slot, L, formed about its center and within the circumference of its periphery, and provided with the rim $D^4$, perforated with a series of indexed holes, $D^7$, for the reception of the pin of the swinging pawl T, and provided with the series of wedge-shaped teeth H, standing out at right angles to the rim, and arranged in alternate positions with and on a line in front of the holes $D^7$, substantially as and for the purposes set forth.

4. The combination, with the dial A of a permutation-lock and the tumbler $D^1$, provided with a series of indexed holes, $D^7$, and teeth H and pawl T, of an actuating-tumbler, D, having a rim, $D^4$, perforated by a series of indexed holes, $D^7$, and arbor $D^6$, stop M, and dial B, substantially as and for the purpose set forth.

5. A series of tumblers, $D^1$ $D^2$ $D^3$, constructed with corresponding radial guide-slots L, and arranged and supported in the casing E, as described, and adapted, when the unlocking combination is disarranged, to support the finger $K^1$ of the finger-bar K in their center of motion, and engaged with the cam-groove of the tumbler D, substantially as set forth.

6. The casing E, constructed with the guide-grooves $E^3$, slot or opening $E^5$, cap $E^2$, and removable section O, substantially as and for the purposes set forth.

7. These following elements in combination: the bar K, provided with the finger $K^1$; tumblers $D^1$ $D^2$ $D^3$, constructed with slots L, and having their rims perforated and indexed, and provided with teeth H and supported in the casing E, as described; tumbler D, constructed with the cam-groove S, and with its rim perforated and indexed, as described; arbor $D^6$; revolving dial B, and stationary dial A, all arranged so that the lock and bolts are operated by a single knob, $B^1$, as set forth.

8. The removable and swinging pawls T, provided with stems, and adapted to be applied to the rims of the tumblers $D^1$ $D^2$ $D^3$, constructed with wedge-shaped teeth H, substantially as set forth.

In testimony that I claim the foregoing as my own I affix my signature in presence of two witnesses.

BENJAMIN F. STEWART.

Witnesses:
J. H. BOOTH,
DANIEL KORNS.